Jan. 10, 1967   B. E. REEVES   3,297,375
DISPLAY CABINET

Filed May 22, 1964   2 Sheets-Sheet 1

INVENTOR.
BLANCHE E. REEVES
BY
Newton, Hopkins & Jones
ATTORNEYS

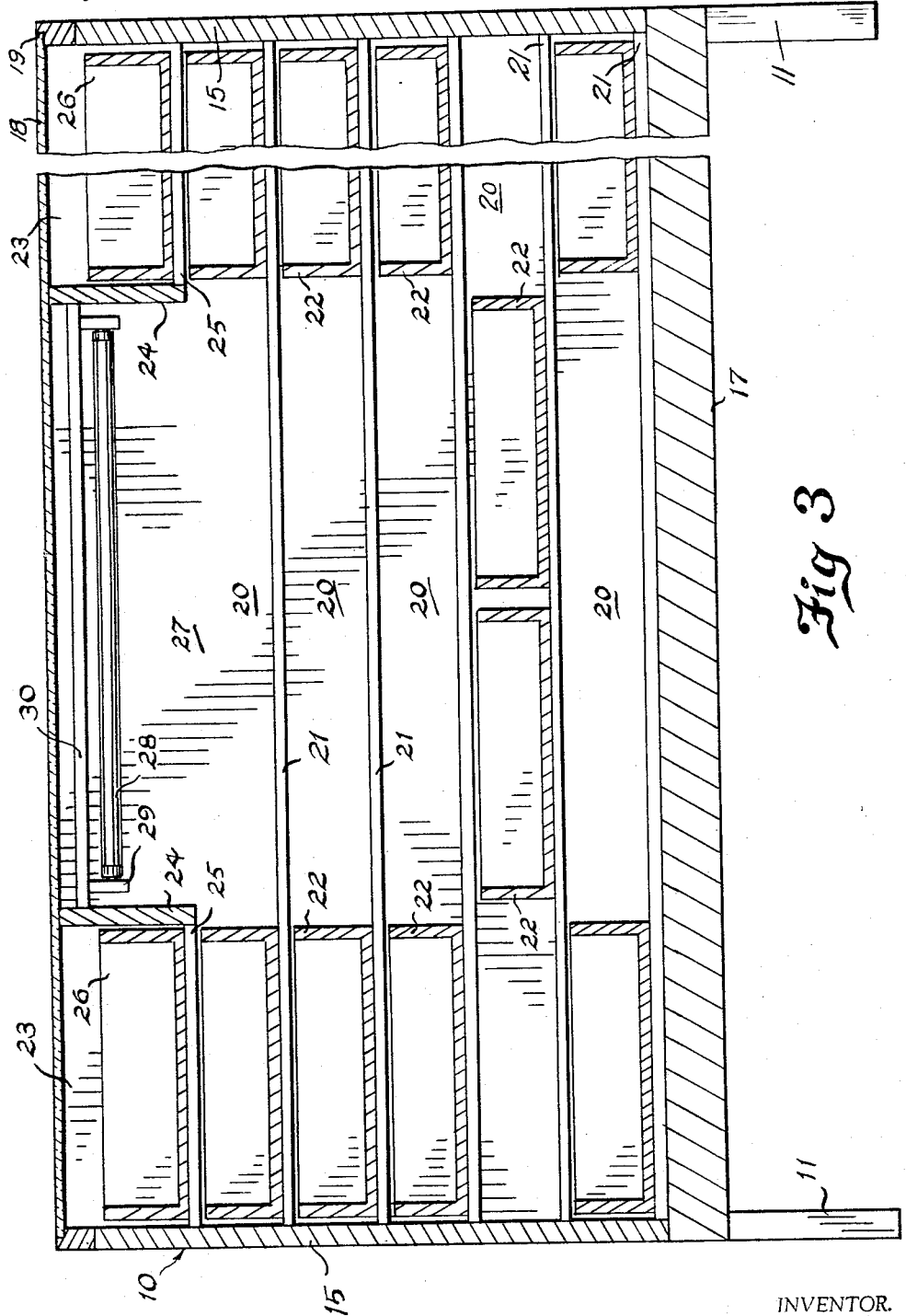

United States Patent Office 3,297,375
Patented Jan. 10, 1967

3,297,375
DISPLAY CABINET
Blanche E. Reeves, 520 E. Paces Ferry Road, NE.,
Atlanta, Ga. 30327
Filed May 22, 1964, Ser. No. 369,473
3 Claims. (Cl. 312—117)

This invention relates to article display cabinets and is particularly concerned with a cabinet for the safe and secure storage and display of articles in rows or tiers without removal of any of the articles from the security provided by the cabinet.

The hazards of theft, mutilation, breakage, damage by handling or moisture and oxidation from ambient atmospheric conditions in the open display of articles such as coins, stamps, jewelry, works of art and the like are generally recognized. Even when normally fully confined in a protective cabinet, such articles may be subject to such hazards when withdrawn for display.

As a means of display without exposure to such hazards, glass topped cabinets are frequently utilized. However, in this solution of the problem, difficulty arises in providing adequate view of all the objects accommodated within the cabinets, particularly where the cabinet capacity is so ample as to provide for stacks or files of objects. Thus, where the display cabinet is provided with only a glass top, it is obvious that inspection may be had of only the articles displayed upon the top shelf or tray.

Attempts have been made to enhance the visibility of articles at other than the top of such cabinets, as by the use of glass sides as well as glass shelving within the cabinet. However, this solution also falls short of perfection in that the articles at the top or front of the cabinet will of necessity obscure to some extent articles therebelow or behind. Even though a staggered relation of articles on the shelves is attempted, clear and unhampered vision is not obtained and much stooping and craning is necessary to achieve even a limited observation of all articles within the cabinet. It is also to be noted that in viewing a great number of articles at one time, in fully glassed cabinets, the articles may appear an indiscriminate mass, one diverting attention from another, and display value is diluted.

The present invention seeks to overcome these and like criticisms of conventional glass, glass topped and/or shelved cabinets by the provision of a cabinet providing a restricted internal viewing zone, with means for selectively moving articles to and from the viewing zone, for unobstructed and full view of selected articles or groups of articles through a single observation glass or equivalent transparency. Although for normal display the present invention does not require withdrawal of articles from the protection of the cabinet, provision is made for the withdrawal of single articles or groups of articles by authorized persons while maintaining the protective enclosure of the remaining contents of the cabinet.

In the specific embodiment of the invention here presented, as illustrative of the one of many possible arrangements by which the present inventive concept may be carried out, the cabinet is a generally rectangular enclosure characterized by imperforate opaque walls but provided with a glass viewing area. In this case the top wall of the cabinet is entirely glass; however, the concept embraces a partially transparent top wall or a fully or partially transparent side or end wall. Within the cabinet two vertical tiers of slidable article trays are provided. Each article tray is here presented as of a width approximately one-quarter the length of the cabinet. Directly below the ends of the glass top wall, separate individual upper end trays are located which restrict vision therebelow into the interior of the cabinet. The individual upper end trays define therebetween a central vertical viewing zone between the tiers of slidable article trays when such article trays are arranged in vertical registration at the ends of the cabinet and beneath the individual upper end trays. The slidable article trays of the tiers below the upper end trays are, of course, obscured when in these end positions. However, each article tray is individually slidable in its horizontal plane from its tier of companion trays to the central viewing zone, here shown as of a width to simultaneously accommodate an article tray from each zone. Thus, each article tray may be selectively located for display in the viewing zone. Removal of the article trays for display of articles therein is thus never required. However, the end walls provide doors for the slidable removal of all trays and their articles by authorized persons when desired. It will be understood that throughout the present discussion the term "glass" is used in a generic sense, contemplating various equivalent rigid transparent materials.

The primary objects of the invention include that of providing a display cabinet with maximum observability of the entire contents of the cabinet. A further object of the present invention is to provide a display cabinet having a single restricted display zone together with means for arranging articles within the cabinet in such manner as to permit selective movement thereof to such display zone. Another object is to provide a display cabinet in which each article within the cabinet may be fully displayed without withdrawal from the cabinet, but which permits authorized persons to withdraw, rearrange or replace the contents of the cabinet. It is also an object of the invention to provide a device of the character set forth which is sturdy, rugged and durable and which fulfills the requirements of esthetic appearance while being adequately suited to meet the demands of both security and economic manufacture. Numerous other objects, features and advantages of the present invention will be apparent from a consideration of the following specification taken in conjunction with the accompanying drawings, in which:

Figures 1, 2:
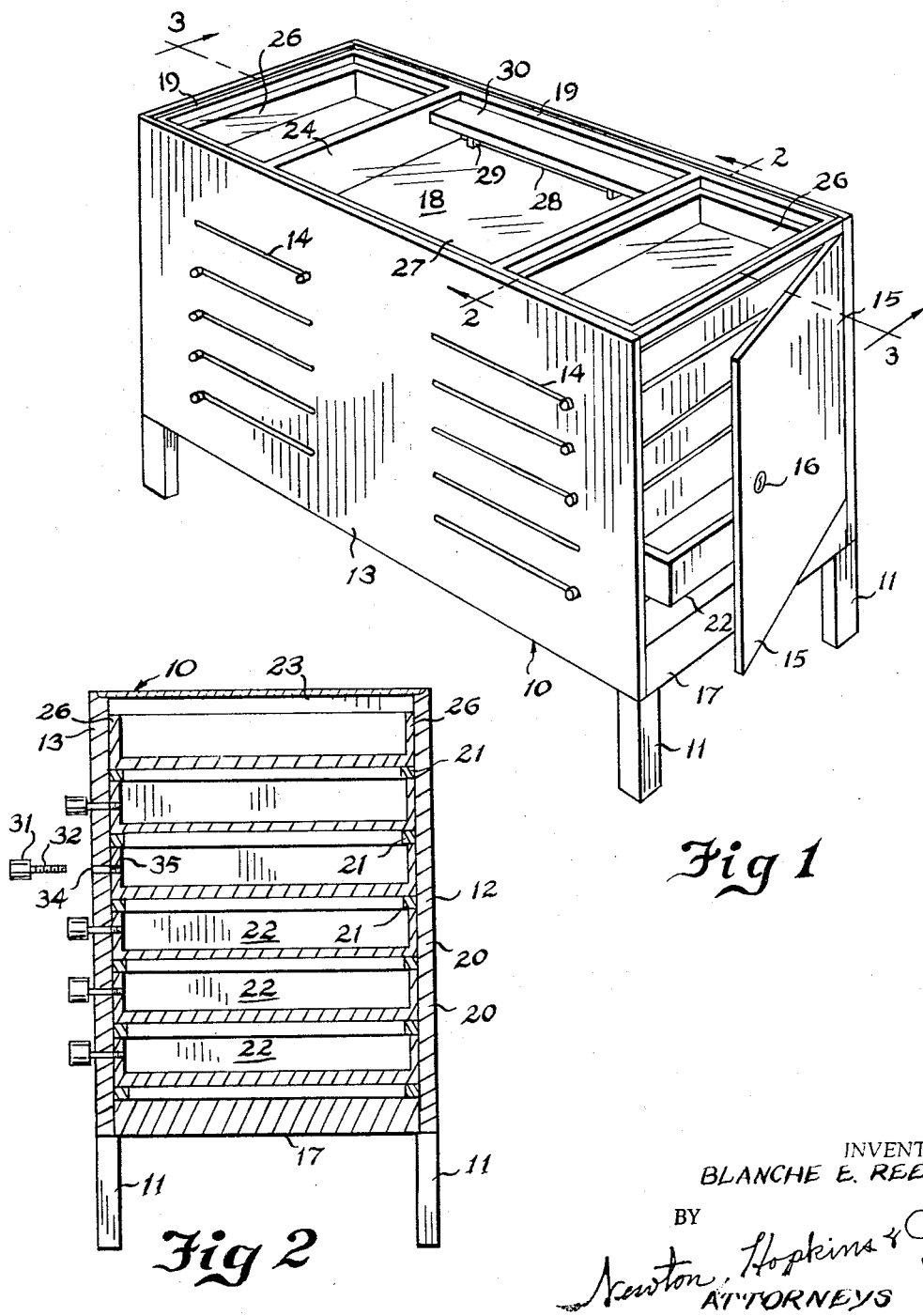
FIG. 1 is a perspective view of one embodiment of the present invention.
FIG. 2 is a vertical sectional view of the invention taken along the line 2—2 of FIG. 1; and, FIG. 3 is a longitudinal sectional view of the invention taken along the lines 3—3 of FIG. 1.

The display cabinet of the present form of the invention comprises a body generally indicated by the numeral 10, the corners of which may be supported by appropriate corner legs 11. The body 10 is here shown as generally rectangular, both internally and externally and in both vertical and horizontal planes. However, many varied design motifs and structural adaptations may be utilized in fulfilling the present inventive concept. The body here shown is characterized by a solid immovable opaque back wall 12 and a similar parallel forwardly spaced immovable and opaque front wall 13. As distinguished from the imperforate back, the front is provided with tiers of parallel horizontal elongate slots 14 (here shown as five (5) in each tier). The end walls of the cabinet are here shown as formed as vertically hinged doors 15 preferably provided with secure locking means as indicated at 16. The lower portion of the cabinet is closed by a solid opaque bottom wall 17. The top wall of the cabinet consists of a single glass plate 18 of such thickness as to deter breakage and such clarity as to provide unimpeded vision therethrough. The glass top 18 may be suitably supported by the rabbeted configuration 19 at the top edges of the front, back and end walls of the cabinet.

The interior of the cabinet is divided into a plurality of equal horizontal areas 20 (here shown as five (5))

extending from one end of the cabinet to the other by five pairs of front and rear slide rails 21. Each horizontal area 20 defined above may be considered as consisting of opposite obscure end zones and a central viewing zone. Each end zone is here shown as of a width approximately one-fourth of the longitudinal length of the entire horizontal area, thus leaving the central viewing zone twice the width of each end zone. Upon each rail 21 there are mounted for longitudinal sliding motion two article trays 22, each of a width commensurate with the width of one end zone and each slidable from an end zone to the central viewing zone.

At the top of the cabinet directly beneath the end portions of the glass 18, and above the upper pair of short rails 21 and article trays 22 thereon, upper end compartments 23 are defined by vertical transverse plates 24 and short horizontal supporting rails 25. Thus, the contents of upper end trays 26 within the upper end compartments 23 are at all times visible.

The upper end trays 26 are permanently located in the upper end compartments 23 except when withdrawn from the cabinet, and shadow the cabinet area therebelow so as to obscure the end zones within the cabinet. However, since the upper end trays 26 of the compartments 23 do not extend inwardly beyond the transverse plates 24, a central viewing zone 27 below the central area of the glass 18 is provided and extends uninterruptedly through the center of the horizontal areas 20 defined by the rails 21 to the bottom wall 17. Adjacent the rear wall of the cabinet, at the top of the central viewing zone 27, a fluorescent light tube 28 mounted in brackets 29 is provided together with a horizontal light shield or reflector 30.

Access to the article trays 22 and upper end trays 26 at either end of the cabinet may be obtained by opening the hinged door 15 at the end nearest the tray 22 or 26 desired. The upper end trays 26 are outwardly slidable on their rails 25, as are the article trays 22 on their rails 21. As noted, the upper end trays 26 are at all times visible through the glass 18. All of the article trays 22 are obscured from vision when in position below the upper end trays 26. However, each article tray 22 includes a disengageable operating knob 31 having a threaded shank 32 engaging a threaded aperture 34 at center of the front 35 of each article tray 22. The shank 32 of each knob 31 extends through the elongated slot 14 in the front wall 13 with which the tray is in registration. The slots 14 at each end of the front wall 13 of the cabinet extend from a position one-half the width of the article tray 22 inwardly from the end for a distance equal to the width of the tray 22. Thus, it will be seen that with the article trays 22 located in the obscure end zones of the areas 20, their knobs will be located at the outer ends of their respective slots 14. However, by moving a selected knob 31 inwardly to the inner end of a slot 14, the associated article tray 22 will be moved inwardly to the central viewing zone 27. Any article tray 22 so moved will be visible through the central portion of the glass top 18.

As indicated in FIG. 3, the dimension of the central viewing zone 27 is twice the width of each article tray. Thus, both trays 22 of any horizontal area 20 may be placed in the viewing zone for simultaneous viewing with the upper end trays 26. Similarly, any article tray 22 on the right side of the cabinet may be positioned in the central viewing zone 27 with any tray 22 from the left side of the cabinet. Thus, it is not required that the two article trays 22 in the central viewing zone 27 be in the same horizontal area 20. Since the knobs and shanks may be readily removed from the fronts of the article trays, it will be seen that upon their removal, the trays 22 are free to slide outwardly on their rails 21 to be removed from the cabinet when the doors 15 are open.

Thus, it will be seen that the present invention provides maximum viewable capacity for a display cabinet. It will be noted that articles within the cabinet are securely protected, but that each article on each tray may be viewed by the successive movements of the article trays 21 to the central viewing zone. As required, the end doors 15 may be unlocked and the trays 22 and 26 removed for rearrangement, change of items or for individual inspection.

It will be understood, of course, that the size, configuration, number of trays and their height or width are not critical. The trays are not required to be all of the same length, height or width and a wide variety of arrangements may be provided. Thus, it will also be understood that the specific apparatus herein presented is by way of illustration only, and is meant to be in no way restrictive. Therefore, numerous changes and modifications may be made and the full use of equivalents resorted to without departing from the spirit or scope of the invention as outlined in the appended claims.

What is claimed as invention is:

1. A display cabinet including a glass top, opaque bottom, front, rear and end walls, a tray compartment formed at each end of said cabinet directly below said glass top, a plurality of pairs of parallel rails within said cabinet, an article tray slidably mounted on each pair of parallel rails, each tray being selectively movable between obscure positions beneath said tray compartment at each end of said cabinet and a position below said glass top inwardly of said tray compartments, and means connected to each of said trays and extending outwardly of said cabinet for moving said trays along said rails from outside said cabinet.

2. A display cabinet including a glass top, opoque bottom, front, rear, and end walls, a tray compartment formed at each end of said cabinet directly below said glass top, said tray compartments defining therebetween a viewing area at the center of said glass top, a plurality of pairs of parallel rails within said cabinet extending the entire internal length of said cabinet and below said end compartments, the rails of each pair of rails being disposed in a common horizontal plane, and a pair of article trays slidably mounted on each pair of parallel rails, each of said trays being selectively movable between a position beneath one of said end compartments and a position in said viewing area, said front wall defining horizontally disposed elongated slots between each of said pairs of rails, a knob connected to each of said trays and extending through one of said slots, whereby the knob of each tray is movable throughout the length of its slot to slide its tray along the pair of rails.

3. A closed cabinet for the display of precious articles comprising:
an exterior housing including a solid vertically disposed opaque back wall, a vertically disposed opaque front wall displaced from and disposed parallel to said back wall, vertically disposed end walls extending between the ends of said back wall and said front wall, a solid horizontally disposed opaque bottom wall closing the bottom of said housing and a solid horizontally disposed transparent top wall closing the top of said housing,
said end walls each including vertically hinged access doors and means for locking said access doors in their closed position,
said back wall and said front wall each supporting a plurality of horizontally disposed runners vertically displaced from each other, each runner of the back wall being disposed in a horizontal plane that includes a runner of the front wall,
a plurality of article display trays, each of said trays being of a width slightly less than the distance between said back wall and said front wall, of a height slightly less than the vertical distance between adjacent runners, and of a length approximately equal to one fourth the distance between said end walls, two of said trays being slidably positioned on each pair of runners disposed in a common horizontal plane, two transverse plates disposed in planes parallel to said end walls, one of said plates being positioned from one of said end walls a distance of approximately one fourth the length of said housing, the other of said plates being positioned from the other of said end walls a distance of approximately one fourth the length of said housing, said transverse plates extending between said transparent top wall and the uppermost of said runners, one of said trays being positioned between one of said end walls and one of said transverse plates and another of said trays being positioned between the other of said end walls and the other of said transverse plates whereby the space in said housing outwardly of said transverse plates is occupied by trays and the space between said transverse plates is left vacant to form a central viewing zone.

said front wall defining a plurality of horizontally disposed elongated slots, one slot being disposed between each of the runners of said front wall, operating knobs connected to each of said trays positioned on the runners disposed below the uppermost runners, said operating knobs extending through said slots whereby the trays positioned on the runners disposed below said uppermost runners can be selectively moved to the said viewing zone as defined by said transverse plates or moved to an area disposed below the trays disposed outwardly of said transverse plates, and illuminating means for illuminating said viewing zone.

References Cited by the Examiner
UNITED STATES PATENTS

| | | | |
|---|---|---|---|
| 332,595 | 12/1885 | Dean | 312—285 |
| 528,035 | 10/1894 | Schoolhouse | 312—122 |
| 1,718,407 | 6/1929 | Buergermeister | 312—285 X |
| 1,900,513 | 3/1933 | Marsh | 273—136 |
| 2,510,124 | 6/1950 | McKinney | 108—23 |
| 2,721,780 | 10/1955 | Peterson | 312—304 |
| 2,904,381 | 9/1959 | Prince | 312—286 X |

FOREIGN PATENTS

| | | |
|---|---|---|
| 1,100,243 | 2/1961 | Germany. |

CLAUDE A. LE ROY, *Primary Examiner.*

A. FRANKEL, *Assistant Examiner.*